(No Model.)  
2 Sheets—Sheet 1.
F. A. NEWELL.
CORN PLANTER.
No. 510,186. Patented Dec. 5, 1893.
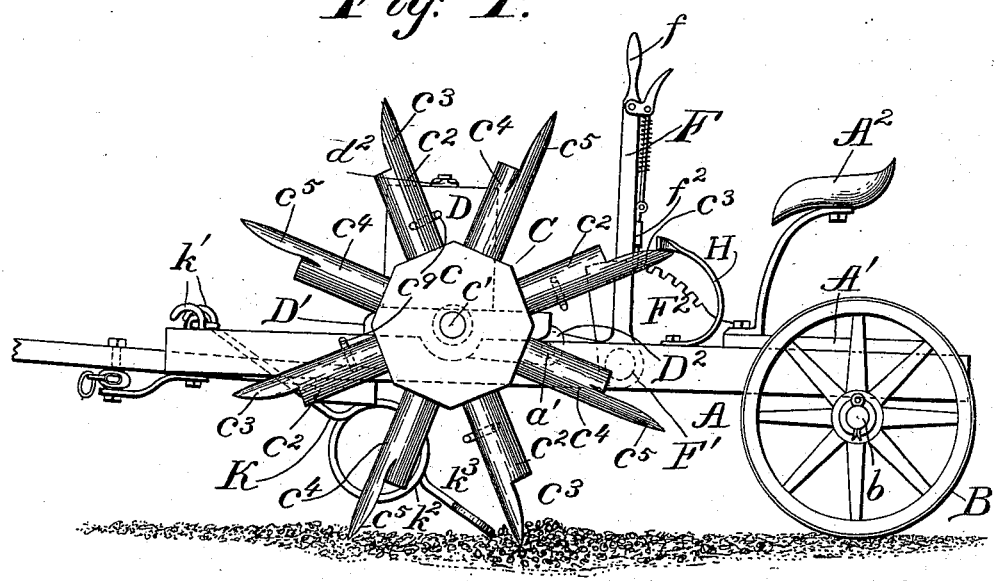
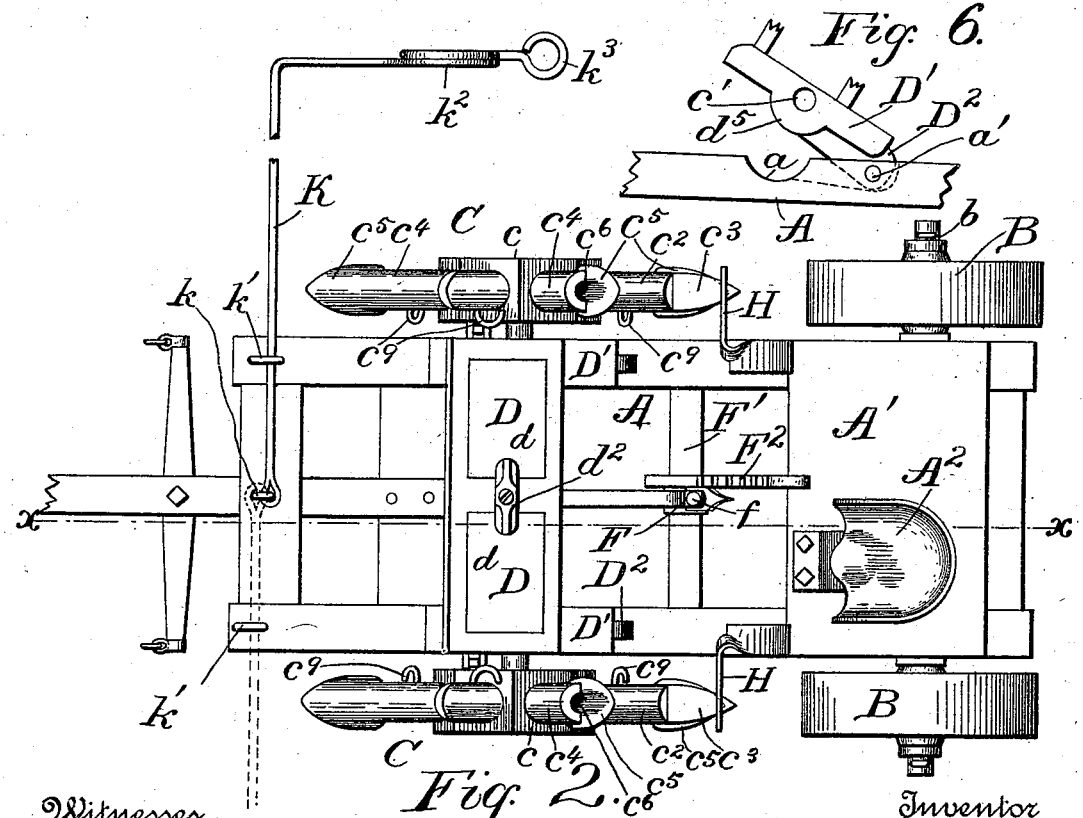
Witnesses  
Inventor  
Frank A. Newell  
By Whitman & Wilkinson,  
Attorneys.

(No Model.) 2 Sheets—Sheet 2.
F. A. NEWELL.
CORN PLANTER.
No. 510,186. Patented Dec. 5, 1893.
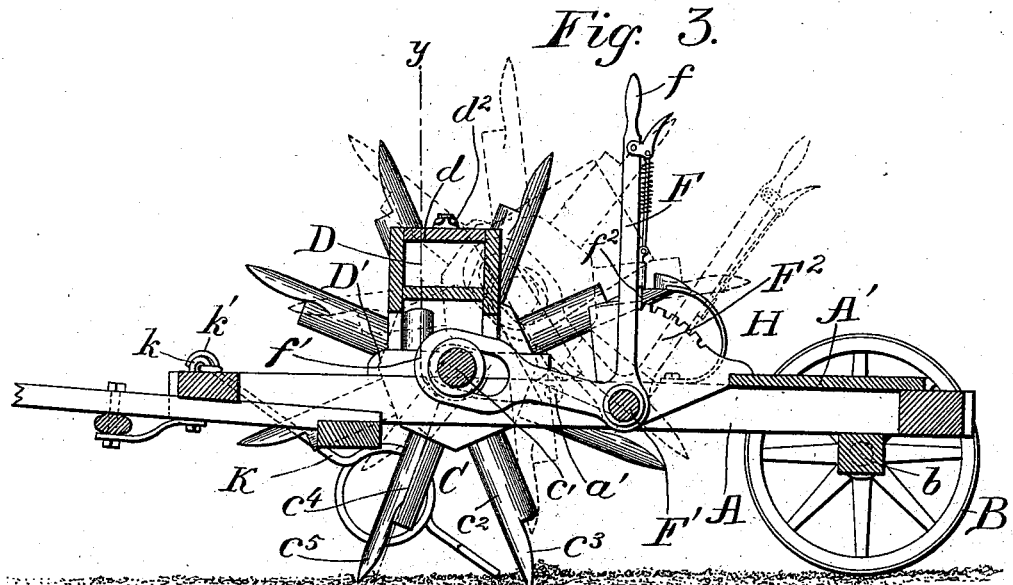
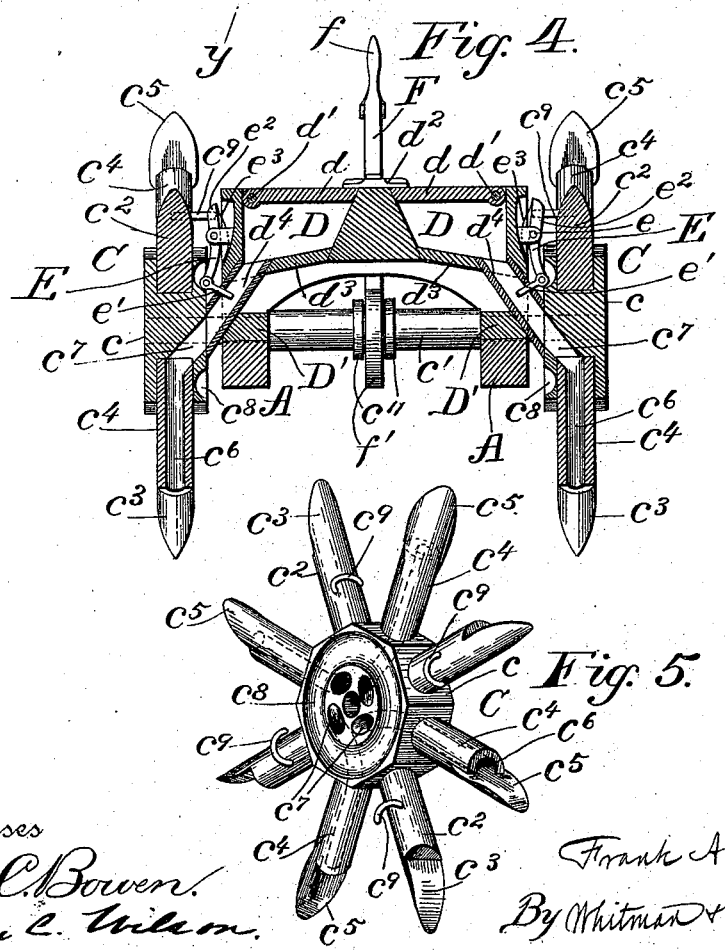
Witnesses
Percy C. Bowen
John C. Wilson
Inventor
Frank A. Newell,
By Whitman & Wilkinson,
Attorneys.
THE NATIONAL LITHOGRAPHING COMPANY,
WASHINGTON, D. C.

UNITED STATES PATENT OFFICE.

FRANK A. NEWELL, OF CHEYENNE, WYOMING, ASSIGNOR OF TWO-THIRDS TO THEODORE GORIE AND HUGO DONZELMAN, OF SAME PLACE.

CORN-PLANTER.

SPECIFICATION forming part of Letters Patent No. 510,186, dated December 5, 1893.

Application filed January 28, 1893. Serial No. 460,095. (No model.)

*To all whom it may concern:*

Be it known that I, FRANK A. NEWELL, a citizen of the United States, residing at Cheyenne, in the county of Laramie and State of Wyoming, have invented certain new and useful Improvements in Corn-Planters; and I do hereby declare that the following is a full, clear, and exact description of the invention, such as will enable others skilled in the art to which it appertains to make and use the same.

This invention relates to improvements in corn planters or machines for the planting of corn, cotton seed, peas, or other grains, and it consists of certain novel features hereinafter described and claimed.

Reference is had to the accompanying drawings, in which the same parts are indicated by the same letters throughout the several views.

Figure 1 represents a side elevation of the machine in operation. Fig. 2 represents a plan view of the same, parts being omitted. Fig. 3 represents a section along the line $x\,x$ of Fig. 2, looking toward the top of the sheet. Fig. 4 represents a section along the line $y\,y$ of Fig. 3 looking to the right. Fig. 5 represents a perspective view of one of the hollow spoke planting wheels, and Fig. 6 represents a detailed view of the method of hinging the shaft of the planting wheels, and the support for the feed hoppers, to the frame of the machine.

A represents the frame of the machine mounted on the rear axle $b$ of the wheels B, and suspended beneath the axle $c'$ of the planting wheels C, as will be hereinafter described.

A' represents a platform across the rear of the frame A, on which the seat $A^2$ is mounted.

C represents one of the two planting wheels, which are made with a hub $c$ into which the solid spokes $c^2$ and the hollow spokes $c^4$ are inserted. The solid spokes $c^2$ have a sharpened end for catching in the ground and for making a hole therein, and the hollow spokes $c^4$ have a shovel tip $c^5$, behind which the seed falls, and by which the earth is pushed backward somewhat over the seed. These hollow spokes $c^4$ have a cylindrical passage $c^6$ connecting with a channel $c^7$ in the hub. These channels $c^7$ align *seriatim* with the delivery tubes $d^4$ at the outer end of the sloping bottom $d^3$ of the hoppers D containing the seeds to be planted. These hoppers are covered by a lid $d$ hinged at $d'$ and held in place by a button $d^2$. In order to prevent a continuous flow of the seed through the hollow spokes as each one gets into position below the said tube $d^4$, a valve $e'$ is provided at one end of the lever E pivoted at $e$, and having its opposite end $e^2$ normally pressed outward by a spring $e^3$, as shown in Fig. 4. Projecting lugs or loops $c^9$ are provided on the inside of the spokes of the wheel C, adapted to strike the arm $e^2$ of the lever E and so to withdraw the valve $e'$ long enough to allow one or two grains to pass. It will be seen that the spring $e^3$ will close the passage $d^4$ as soon as the pressure from the arm $e^2$ of the lever E is removed.

F represents a bell-crank lever pivoted at F' and having one arm terminating in a handle $f$ with spring-pawl attached, and the other arm terminating in an oblong collar $f'$ loosely mounted on a shaft $c'$, and held between the fixed collars $c^{11}$ on said shaft.

$F^2$ represents a rack secured to the frame work A and adapted to engage the spring-pawl $f^2$. By means of this, the bell crank lever F, the planting wheel and seed hoppers may be thrown up into the position shown in dotted lines in Fig. 3, in which position they will be held by the rack $F^2$ and spring-pawl $f^2$. This is desirable in turning the planter around, or in passing obstructions, &c. In order to ease the strain from the bell-crank lever F somewhat, the beams D' supporting the hoppers D, in which the shaft $c'$ is journaled, are connected by another beam $D^2$ pivoted at $a'$ to the frame A.

When the planting wheels are down in position, as shown in Fig. 1, the projections $d^5$ on the lower side of the beam D' engages in a recess $a$ in the frame work A, and thus prevents any tendency to motion lengthwise in the frame; the downward pressure of the weight of the carriage suspended beneath the axles $c'$ is transferred by means of the bell crank lever F to the pivot F' and the rack $F^2$, which should be made of sufficient strength to stand the severe strain placed upon them.

H represents a scraper, projecting from the frame and engaging the shovel end of the spokes. This scraper cleans off the ends of the spokes sufficiently to allow them to enter freely into the ground and also scrapes off any soil which might tend to clog the hollow spokes.

K represents a reversible row marker which is connected at $k$ to an eye-bolt in the center of the machine, and passes under a hook $k'$ at one or the other side thereof. The outer end of the row marker is preferably made springy as at $k^2$ and may be provided with a loop $k^3$ for widening the mark in the earth for the next row. By reversing the row marker as shown in dotted lines in Fig. 2 a row may be laid off on the opposite side.

The operation of the device is as follows: The corn or other grain to be planted is put in the hoppers D and is periodically released by the lugs $c^9$ and valves $e'$, falling through the passages $d^4$, $c^7$, and $c^6$, into the hole made by the shovels $c^5$, where it is covered by the wheel B which compresses the earth into the hole. The row marker K marks off an adjoining row, or the said row marker may not be used if it is not desired. When the end of the row is reached the driver pulls down the handle $f$ of the lever F raising the planting wheel into the position shown in dotted lines in Fig. 3, and the vehicle is readily turned on the wheels B.

Having thus described the invention, what is claimed as new is—

1. In a corn planter, the combination with a main frame and wheels supporting the rear end of said frame; of a secondary frame hinged to said main frame; hoppers and stellated wheels with hollow hubs and spokes mounted in said secondary frame, a lever pivoted in said main frame and having one arm attached to said secondary frame and the other arm terminating in a handle, with means for holding said lever in the desired position, substantially as and for the purposes described.

2. In a corn planter, the combination with a main frame and wheels supporting the rear end of said frame; of a secondary frame hinged to said main frame; hoppers and stellated wheels with hollow hubs and spokes mounted in said secondary frame, a bell crank lever pivoted in said main frame and having one arm attached to said secondary frame and the other arm terminating in a handle, a spring pawl mounted in said handle, and a rack fixed to said main frame and adapted to engage said pawl, substantially as and for the purposes described.

3. In a corn planter, the combination with a main frame and wheels supporting the rear end of said frame; of a secondary frame hinged to said main frame; hoppers provided with delivery passages mounted on said secondary frame, stellated wheels with hollow spokes and hubs connecting with said passages, the said wheels being also mounted on said secondary frame, means operated by the wheels for periodically opening said passages, and means for raising said secondary frame and for holding said stellated wheels at any desired position relative to the ground, substantially as and for the purposes described.

4. In a corn planter, the combination with a main frame and wheels supporting the rear end of said frame; of a secondary frame hinged to said main frame; hoppers provided with delivery passages mounted on said secondary frame, stellated wheels with hollow spokes and hubs connecting with said passages, the said wheels being also mounted on said secondary frame; levers pivoted to said hoppers and each provided with a striking arm and a valve arm; a valve attached to said valve arm and adapted to control said passages, lugs on said hollow spokes for striking the arm of said lever, and means for raising said secondary frame and for holding said stellated wheels at any desired position relative to the ground, substantially as and for the purposes described.

In testimony whereof I affix my signature in presence of two witnesses.

FRANK A. NEWELL.

Witnesses:
MARY AMAN,
ANDREW P. SWAIMAN.